June 29, 1965
D. R. KNOX
3,191,290
METHOD OF MAKING A PUSH ROD
Filed June 2, 1961
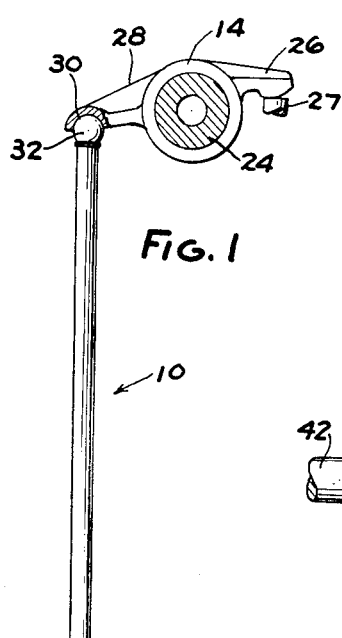
FIG. 1
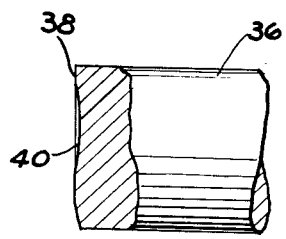
FIG. 3
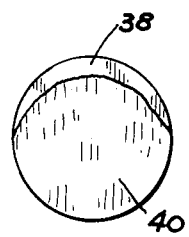
FIG. 2
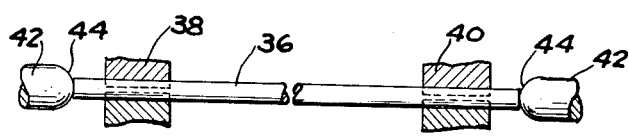
FIG. 4
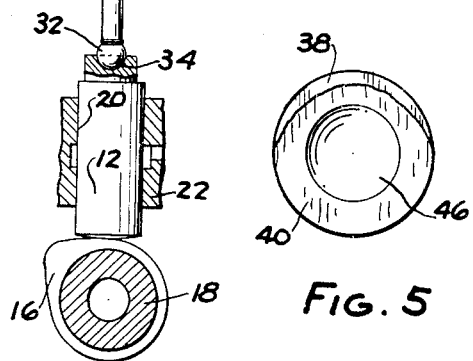
FIG. 5
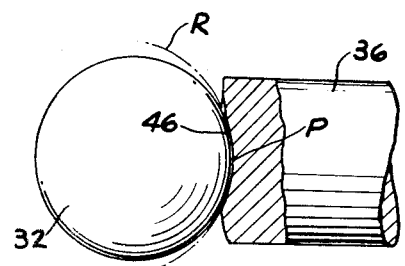
FIG. 6
FIG. 7
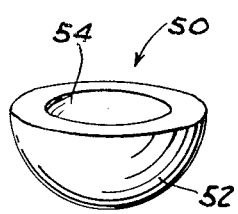
FIG. 8
INVENTOR.
DAVID R. KNOX
BY
Barnes, Kisselle, Raisch & Choate
ATTORNEYS

United States Patent Office 3,191,290
Patented June 29, 1965

3,191,290
METHOD OF MAKING A PUSH ROD
David R. Knox, Detroit, Mich., assignor to Bundy Tubing Company, Detroit, Mich., a corporation of Michigan
Filed June 2, 1961, Ser. No. 114,389
5 Claims. (Cl. 29—475)

The push rod of this invention may be used to interconnect a variety of movable members in various kinds of machines, and the push rod is especially useful where one or more of the members has a rotary component of motion. The present disclosure is made with reference to a push rod for operably connecting a valve lifter with a valve-operating rocker arm in an internal combustion engine.

Specifically the invention involves a push rod made by welding an end piece which provides the bearing surface to the end of a solid rod as distinguished from a tubular rod. In manufacture it is desirable to be able to shear the rods to length from longer pieces of wire or rod stock.

In shearing a rod, only a portion of its thickness is actually severed by the shearing tool, and the remainder of the thickness is broken or torn rather than being cut. The resulting end face of the rod is characteristically irregular, and the general plane of the face is angled somewhat to the axis of the rod rather than being perpendicular. This makes it very difficult to weld an end piece to the rod end with the accuracy of concentricity and length required in a push rod.

It is possible to machine or grind the end face of a rod to provide it with a flat surface perpendicular to the rod axis but such procedures are relatively slow and add significantly to the cost of manufacture, especially where the push rod is made in high-production quantities.

The primary object of this invention is to provide a method of welding end pieces to solid push rod bodies which is simple, relatively inexpensive, and which facilitates rapid manufacture while maintaining close length and concentricity tolerances.

In general the invention contemplates striking the sheared end face of the rod with a punch which is contoured to deform the end face and provide it with a rounded surface defining a seat substantially concentric with the rod axis and accurately positioned longitudinally. The conformation of this seat is such that it will engage a surface of the end piece at a point contact substantially coinciding with the rod axis. When the welding pressure and heat are applied to the rod and end piece, they can be readily held in concentric relation until the weld is effected. In the drawings:

FIG. 1 is a view partly in elevation and partly in section illustrating a push rod made according to this invention in use.

FIG. 2 is an enlarged end view partly diagrammatically illustrating the condition of the end face of the rod after it has been sheared to length.

FIG. 3 is a partly diagrammatic, partly sectional view of the sheared end of the rod.

FIG. 4 is a partly diagrammatic view illustrating a step in preparing the rod for the welding operation.

FIG. 5 is a view similar to FIG. 2 but illustrating the condition of the rod after it has been indented by the step shown in FIG. 4.

FIG. 6 is a fragmentary partly sectional view illustrating the relation of the parts preparatory to welding.

FIG. 7 is a view similar to FIG. 6 but showing the relation of the parts after the welding has been completed.

FIG. 8 is a perspective view of another form of end piece which can be used in the method of this invention.

Shown in FIG. 1 is a push rod 10 made according to this invention and operably interconnecting a valve lifter 12 and a valve operating rocker 14. Lifter 12 is raised and lowered by a cam 16 on a cam shaft 18 and the lifter moves in a guide 20 which may be formed in an engine block 22. Rocker 14 is rockably mounted on a shaft 24 with one arm 26 operably engageable with a valve 27 and with another arm 28 on the opposite side of shaft 24 engaged with the push rod. Rocker 14 may be spring-biased in a conventional way for engagement against the push rod. Arm 28 has a projection with a spherical cup shaped surface 30 engaged with a ball shaped end piece 32 at one end of the push rod. Valve lifter 12 is provided with a spherical recess 34 for receiving the ball shaped end piece 32 at the other end of the rod.

The push rod body 36 is formed from a length of solid rod as distinguished from tubular rod. This rod has been cut to length by a shearing process from a longer length of rod or wire stock. Characteristically, the shearing process results in the end face of the rod having one portion 38 which is actually severed by the shearing tool and another portion 40 which is torn or broken away. The torn or broken portion of the thickness of the rod tends to angle somewhat from a plane perpendicular to the axis of the rod. Thus the shearing results in a face which is both irregular and angled somewhat as represented in FIGS. 2 and 3.

After a rod 36 has been sheared to length, its end faces are subjected to a punching operation to prepare them for welding to the end pieces which will provide the bearing surfaces. The rod is anchored as by clamps 38 and 40 and each end face of the rod is struck by a punch 42 having a round contoured nose 44. The punches deform the end faces of the rod, thereby providing each end face with a rounded recessed seat 46 extending transversely of the rod axis. The punches are accurately axially aligned with the rod when they engage it so that the seat is concentric around the rod axis. The extent of axial advance of the punches is accurately controlled so that the longitudinal distance between the bottoms of the seats is held to close tolerances.

In one form of the invention end pieces 32 comprise standard commercially available steel balls. Balls 32 have a radius which is smaller than the radius of curvature R of seat 46 (FIG. 6).

In manufacture, a ball 32 and a rod 36 are disposed in suitable electrodes (not shown) with the ball and rod axially aligned. The electrodes are advanced toward each other and the ball engages the bottom of seat 46 in a substantially point contact at point P which lies substantially on the rod axis. When the ball and rod are urged against each other, they tend to center themselves accurately relative to each other because the walls of seat 46 slope symmetrically toward its central portion.

When the ball and rod are engaged at point P, welding current is passed between the electrodes and the force urging the rod and ball toward each other is continued. The welding is initiated at point P and spreads radially outwardly. The ball and rod are advanced toward each other so that the metal in the region of their juncture fuses. Then the welding current is cut off and the fused metal cools to form a welded connection W between the ball and rod (FIG. 7). Fillets F are formed during the welding.

In actual production of push rods about 10 inches long at a cyclic rate of about 4,000 units per hour utilizing the method of the present invention, it has been found that the overall length of the push rod can be easily controlled to within about .002 inch. Under the same conditions, eccentricity of balls 32 relative to rods 36 is easily kept below .007 inch.

FIG. 8 illustrates an end piece 50 which is cup shaped rather than spherical. This end piece has an outer surface 52 with a radius of curvature smaller than seat radius R. Cup 50 has an inner concave surface 54 concentric with the outer surface and providing a bearing surface for engagement with parts in a valve train adjacent the push rod. In manufacture, cup 50 is axially aligned with rod 36 and its bottom is engaged against seat 46 at point P with bearing surface 54 disposed axially away from the rod. The welding is effected in the same way as with ball 32.

I claim:

1. The method of making a push rod by welding an end piece to an end face of a length of rod stock, said end face having irregularities such as are caused by shearing and the like, said method comprising, centering a punch substantially on the longitudinal axis of said rod, advancing said punch longitudinally substantially axially of said rod toward said end face while said punch is so centered, and striking with said punch a portion of said end face having a diameter which is smaller than the diameter of said end face, and thereby providing said end face with a rounded surface portion defining a seat having said smaller diameter, said seat having a central portion and having adjacent portions which slope substantially symmetrically to said central portion, providing an end piece having a first surface portion dimensioned and contoured so that it is engageable with said central portion of said seat substantially in a point contact, and having a second portion forming a bearing surface adapted to engage a part of a machine with which said push rod is adapted to be used, engaging said first surface portion against said central portion of said seat substantially in a point contact, applying pressure to said rod and end piece to urge them toward each other, and utilizing said symmetrical slope of said seat to maintain said point contact substantially at said central portion of said seat, and, while applying said pressure, applying heat to the interengaged portions of said rod and end piece, said pressure and heat being sufficient to cause the metal of said rod and end piece to fuse and form a welded connection.

2. The method defined in claim 1 wherein said end piece comprises a ball.

3. The method defined is claim 1 wherein said end piece is cup shaped with an exterior surface forming said first surface portion and a concave surface providing said bearing surface.

4. The method of making a push rod by welding an end piece to an end face of a length of rod stock, said end face having irregularities such as are caused by shearing and the like, said method comprising, centering a punch substantially on the longitudinal axis of said rod, advancing said punch longitudinally substantially axially of said rod toward said end face while said punch is so centered, and, by means of said punch, providing said end face with a recessed surface extending transversely of the rod axis and defining a seat having a diameter smaller than the diameter of said end face, said seat having a central portion and having adjacent portions which slope substantially symmetrically relative to said central portion, providing an end piece having a first rounded surface dimensioned and contoured so that it is engageable with said central portion of said seat substantially in a point contact, and having a second rounded surface defining a bearing surface adapted to engage a part of a machine with which said push rod is adapted to be used, engaging said first rounded surface against said central portion of said seat in substantially a point contact, applying pressure to said rod and end piece to urge them toward each other, and utilizing said symmetrical slope of said seat to maintain said point contact substantially at said central portion of said seat, and, while applying said pressure, applying heat to the interengaged portions of said rod and end piece, said pressure and heat being sufficient to cause the metal of said rod and end piece to fuse and form a welded connection.

5. The method of making a push rod by welding an end piece to an end face of a length of rod stock, said end face having irregularities such as are caused by shearing and the like, said method comprising, striking with a punch a portion of said end face having a diameter which is smaller than the diameter of said end face, and thereby providing said end face with a rounded, recessed seat having said smaller diameter, said seat having a central portion which is substantially coincident with the axis of said rod and having adjacent portions which slope substantially symmetrically to said central portion, providing an end piece having a first surface portion with a radius of curvature smaller than that of said seat so that said first surface portion is engageable with said central portion of said seat substantially in a point contact, and having a second surface portion forming a bearing surface adapted to engage a part of a machine with which said push rod is adapted to be used, said first and second surface portions having a common axis of symmetry, engaging said first surface portion against said central portion of said seat substantially in a point contact with said end piece oriented so that the rod axis and said axis of symmetry substantially coincide, applying pressure to said rod and end piece to urge them toward each other, and utilizing said symmetrical slope of said seat to maintain said point contact substantially at said central portion of said seat, and, while applying said pressure, applying heat to the interengaged portions of said rod and end piece, said pressure and heat being sufficient to cause the metal of said rod and end piece to fuse and form a welded connection.

References Cited by the Examiner

UNITED STATES PATENTS

| | | | |
|---|---|---|---|
| 914,946 | 3/09 | Haldy | 219—52 X |
| 2,419,316 | 4/47 | Engemann. | |
| 2,735,313 | 2/56 | Dickson. | |
| 2,960,080 | 11/60 | Burnard et al. | |
| 2,975,775 | 3/61 | Macura. | |
| 3,010,011 | 11/61 | Darlington | 219—105 X |
| 3,024,775 | 3/62 | Wuest. | |

FOREIGN PATENTS 543,703  5/56  Italy.

JOHN F. CAMPBELL, *Primary Examiner.*